United States Patent [19]

Fietzke et al.

[11] Patent Number: 5,058,429
[45] Date of Patent: Oct. 22, 1991

[54] APPARATUS FOR MEASURING AN UNBALANCE OF A ROTARY MEMBER

[75] Inventors: Günter Fietzke, Forest; Richard Müller, Lynchburg, both of Va.

[73] Assignee: Gebruder Hofmann GmbH & Co. KG Maschinenfabrik, Pfungstadt, Fed. Rep. of Germany

[21] Appl. No.: 479,244

[22] Filed: Feb. 13, 1990

[51] Int. Cl.⁵ ............................................. G01M 1/02
[52] U.S. Cl. .................................................... 73/475
[58] Field of Search ............... 75/460, 462, 471, 472, 75/473, 475, 476, 477, 478, 479

[56] References Cited

U.S. PATENT DOCUMENTS

| | | | |
|---|---|---|---|
| 3,049,927 | 8/1962 | Merrill et al. | 73/475 |
| 4,297,882 | 11/1981 | Curchod et al. | 73/460 |
| 4,712,425 | 12/1987 | Augendre et al. | 73/462 |
| 4,868,762 | 9/1989 | Grim et al. | 73/462 |

Primary Examiner—John E. Chapman
Attorney, Agent, or Firm—Cushman, Darby & Cushman

[57] ABSTRACT

An apparatus for measuring an unbalance of a rotary member, such as an electric motor armature, comprises a rotary member mounting arrangement for rotatably mounting the rotary member for a measurment operation. The mounting arrangement is capable of oscillating movement in a measurement direction. A drive belt for driving the rotary member in rotation bears against the rotor in substantially tangential relationship therewith or passes around the rotor over a small part of the periphery thereof. A measurement transducer detects forces or oscillations produced by the rotation of the rotary member in the measurement direction and outputs a corresponding signal for unbalance measurement. The drive direction of the belt drive in relation to the rotary member is normal to the measurement direction. The measurement direction may be inclined to facilitate fitting the rotary member into and removing it from the mounting arrangement of the apparatus.

13 Claims, 1 Drawing Sheet

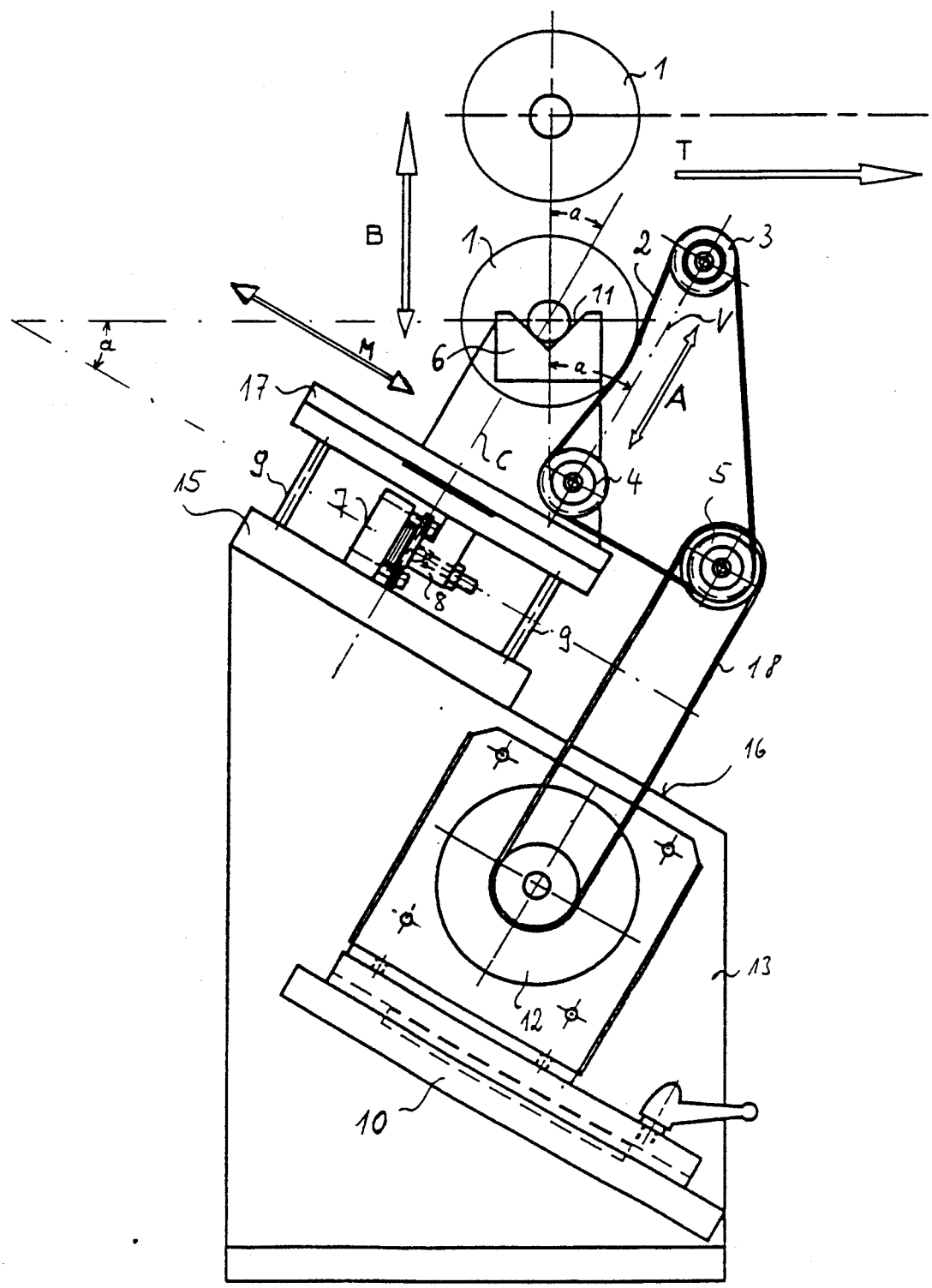

ing means, without being impeded by the belt drive means.

APPARATUS FOR MEASURING AN UNBALANCE OF A ROTARY MEMBER

BACKGROUND OF THE INVENTION

There is an increasing need nowadays for rotors or rotary members to be properly balanced, in particular when such a member is intended to be operated at a high speed of rotation. For the purposes of balancing a rotary member, as will be readily appreciated, it is first necessary to detect and measure the unbalance thereof. A typical form of apparatus for the measurement of unbalance on a rotary member comprises a rotary member mounting means which is capable of oscillating in a measurement direction and in which the rotary member is rotatably mounted for the measurement operation. The rotor can be driven in rotation by a belt drive in the measurement operation, and a measurement transducer device detects forces or oscillations produced by the rotary member during rotation thereof, which are operative in the measurement direction, and supplies a corresponding signal for unbalance measurement.

In a measurement station which includes a measuring apparatus of the above-indicated kind, and more especially in automatic balancing installations, the belt drive for driving the rotary member in rotation bears against the rotary member at the underside thereof in tangential relationship therewith, or has the belt of the belt drive passing around a small portion of the periphery of the rotary member, also at the underside thereof. The pulling direction of the belt or the belt drive, for driving the rotary member in rotation by virtue of the pulling force applied thereto, is the same as the measurement direction in which the measurement transducer device on the rotary member mounting assembly detects forces or oscillations produced upon rotation of the rotary member. The pulling direction of the belt where it engages the rotary member and the measurement direction are disposed horizontally. That arrangement is intended in particular to ensure that the rotary member can be fitted into and removed from the rotary member mounting means, without being impeded by the belt drive. That is a consideration of major significance in particular in relation to automatic balancing installations in which balancing operations are to be carried out at a high cycle rate.

It has been found with the above-indicated measuring apparatus that, during the measuring run, forces which can affect the measurement result may occur synchronously with the speed of rotation of the rotary member.

SUMMARY OF THE INVENTION

An object of the invention is to provide an apparatus for measuring unbalance on a rotary member, which is capable of producing substantially accurate measurement results, while being of a simple design configuration.

Another object of the present invention is to provide an apparaus for measuring unbalance on a rotary member, which is capable of substantially eliminating interference effects which can falsify the measurement result, due to forces which occur synchronously with the rotary movement of the rotary member in a measuring run.

Still another object of the present invention is to provide an apparatus for measuring unbalance of a rotary member, which can provide accurate results while being of a design configuration which permits the rotary member to be easily fitted into and removed from the apparatus.

In accordance with the present invention those and other objects are attained by an apparatus for measuring unbalance on a rotary member, comprising a rotary member mounting means which is adapted to perform an oscillating movement in a measurement direction and in which the rotary member is rotatably supported in the measurement operation. The apparatus includes a belt drive means having a belt which bears against the rotor in substantially tangential relationship therewith or which extends around the periphery of the rotor to a slight degree, thereby to drive the rotary member in rotation in the measurement operation. The drive direction of the belt drive in relation to the rotary member is normal to the measurement direction. A measurement transducer means is operable to detect forces and/or oscillations which occur in the measurement direction, and to supply a corresponding measurement signal for measurement of the unbalance of the rotary member.

The invention is based on the consideration which was arrived at by the present inventors that the forces which occur synchronously with the rotary movement of the rotary member and which can falsify the measurement result derive from defects and flaws in respect of roundness of the rotary member, that is to say it is not of a circular cross-section, and/or errors in respect of rotational truth of the rotational member, that is to say for example its axis of rotation is not precisely central of the rotary member. In the measuring run, such errors and defects cause the tension of the drive belt to vary in each revolution of the rotary member. Such variations in tension then give rise to the fluctuations in force, which have an effect not only in a radial direction but also in a tangential direction relative to the rotor, that is to say in the pulling direction of the drive belt where it engages the rotor and accordingly also in the measurement direction where the measurement direction is coincident with the direction of drive of the belt drive. It was then found that, when the pulling or drive direction of the belt drive relative to the rotary member is at least substantially normal to the measurement direction of the measurement transducer means, the above-indicated errors in the measurement result and the falsification thereof can be at least considerably minimised and even removed.

In a preferred feature of the invention, the measurement direction of the measurement transducer means may be inclined relative to the horizontal and the belt drive means may be inclined relative to the vertical, each through the same angle and more particularly an acute angle, while retaining the angular relationship of substantially 90° between the pulling or drive direction of the belt drive means and the measurement direction. That configuration can be advantageously used in an installation which includes the measuring apparatus in conjunction with a conveyor apparatus for the rotary members, which provides that the rotary members are fitted into and removed from the rotary member mounting means of the measuring apparatus in an at least substantially vertical direction. The inclined positions of the measurement direction and the drive direction of the belt drive means provide that the rotary member can be fitted into and removed from the apparatus in a substantially vertical direction, without being impeded by the belt drive means.

In a preferred feature the above-indicated angle of inclination is substantially 30°.

The rotary member mounting means may preferably comprise an upwardly open mounting shell or support structure so that the rotary member can be easily fitted into and removed therefrom. The mounting shell or support structure may comprise a half-shell structure, for example of brass, or for example a prism-type mounting shell arrangement.

Preferably the measurement transducer means includes a measurement transducer which is so arranged that, when the rotary member is fitted into the rotary member mounting means, the measurement transducer is not subjected to a load thereby.

It will be appreciated that the apparatus in accordance with the principles of the present invention can be used to advantage in particular in automatic balancing installations which involve measuring the unbalance of and balancing a large number of rotors, in short cycle times for each measurement operation. The rotary members may be for example the motor armatures of electric motors, and the like.

Further objects, features and advantages of the present invention will become apparent from the following description of a preferred embodiment thereof.

BRIEF DESCRIPTION OF THE DRAWING

The single FIGURE of the accompanying drawing is a side view of an unbalance measuring apparatus in accordance with the present invention.

DESCRIPTION OF THE PREFERRED EMBODIMENT

Referring now to the drawing, shown therein is an embodiment of an apparatus for measuring unbalance of a rotor or rotary member as indicated at 1. In the illustrated structure, a measuring table 15 is mounted on an inclined mounting surface 16 of a machine frame assembly 13. Reference numeral 6 identifies a rotary member mounting arrangement having a prism-type or V-shaped mounting shell member 11, the mounting arrangement 6 being mounted on the measuring table 15 in such a way that it is capable of performing an oscillating movement relative thereto, by way of springs 9 which are illustrated in the form of bar springs. The direction of oscillating movement which is predetermined by virtue of the arrangement and configuration of the springs 9 is indicated by a double-headed arrow M. That direction M of oscillating movement also corresponds to the measurement direction of a measurement transducer means which includes a measurement transducer 7 supported on the machine frame assembly 13. The rotary member mounting arrangement 6 is supported at the upper ends of the springs 9 by way of a mounting plate arrangement 17. Disposed at the underside of the mounting plate arrangement 17 is a generally loop-shaped transmission structure 8 for transmitting to the measurement transducer 7 the oscillations and/or forces which originate from the rotary member mounting arrangement 6 and the mounting plate arrangement 17 and which are produced by the rotary member 1 as it rotates in an unbalance measurement operation.

A measurement table 15 of the above-indicated kind, with two rotary member mounting arrangements 6 of which only one can be seen in the drawing serves to support the rotary member 1 in an unbalance measuring run. Thus, the measuring structure of the illustrated embodiment comprises the measuring table 15 which is supported by way of four springs 9 which in particular are in the form of round bar springs, first and second measurement transducers 7 and first and second rotary member mounting arrangements 6 which are supported on the measuring table 15.

The illustrated construction is used for measuring the unbalance of rotary members which are mounted in the mounting shell structures 11 of the two rotary member mounting arrangements 6, by way of shaft portions or trunnions which are disposed at respective ends of the rotary member and of which one can be seen in the drawing.

For the purposes of driving the rotary member 1 in rotation, the illustrated apparatus has a belt drive comprising an endless drive belt 2 which is passed around three guide rollers or pulleys 3, 4 and 5 arranged in a generally triangular configuration, as can be clearly seen from the drawing. The apparatus further includes an actuating drive belt 18 which also passes around the guide roller or pulley 5 or a pulley member associated therewith, and a pulley (shown but not referenced) which is fixed on the output shaft of a drive motor 12. The endless drive belt 2 of the belt drive bears against the rotary member 1 which is to be driven in rotation, in substantially tangential relationship therewith or in such a way as to extend around a portion of the periphery of the rotary member, with such contact between the belt and a portion of the periphery of the rotary member being due to the fact that the endless drive belt 2 is pressed against the peripheral surface of the rotary member 1. It will be seen from the drawing that the drive direction for driving the rotary member 1 in rotation, as indicated by the double-headed arrow A, extends tangentially with respect to the rotor 1 and normal to the measurement direction M of the measurement transducer 7. The drive direction A is determined by the positions of the two guide rollers 3 and 4 and extends parallel to the connecting line V which interconnects the axes about which the two guide rollers 3 and 4 rotate.

As the construction shown in the drawing also illustrates, the belt drive comprising the guide rollers 3, 4 and 5 and the endless drive belt 2 is inclined relative to the vertical by a given angle as indicated at a. The angle a is preferably an acute angle and is such that the rotary member 1 can be fitted into and removed from its mounting arrangement 6 in the direction indicated by the double-headed arrow B, without being impeded by the belt drive and in particular without being impeded by the upper guide roller 3 for the drive belt 2. Thus for example, if the illustrated apparatus is part of an automatic balancing installation, after the rotary member 1 which has been measured in respect of its unbalance has been moved in a vertical direction out of its mounting arrangement 6, it can then be further transported for example towards the right in the drawing as indicated by the arrow T to move into a further processing or machining station (not shown) of the automatic balancing installation. In such an installation for example the rotary member 1, after the measuring run, may be machined in order to bring it into a condition of balance, in dependence on the measured unbalance thereof.

Likewise, the measurement direction M of the measurement transducer 7 is inclined relative to the horizontal by at least substantially the same angle a so that the right-angled relationship between the pulling or drive direction A of the belt drive and the measurement direction M of the measurement transducer 7 is maintained. It will be seen from the drawing however that the mounting shell member 11 is arranged horizontally in the rotary member mounting arrangement 6.

It will also be noted from the drawing that a connecting line C which interconnects the axis of rotation of the rotary member 1 fitted to the rotary member mounting arrangement 6 and the point of engagement of the transmission device 8, with which forces and/or oscillations induced by the rotary member 1 are transmitted to the measurement transducer 7, is also inclined relative to the vertical at an acute angle a. In other words, the connecting line C extends parallel to the direction A of the endless belt 2 of the belt drive.

As indicated above, the acute angle a is of such a magnitude that the rotary member 1 can be fitted into and removed from the mounting arrangement 6 in the vertical direction as indicated by the double-headed arrow B, without being impeded by other parts of the apparatus. As is shown in the illustrated embodiment, the angle a is preferably about 30°.

In addition, in the illustrated embodiment, the measurement transducer 7 is preferably so arranged that it is disposed inclinedly above the transmission arrangement 8 for transmitting to the measurement transducer 7 oscillations and/or forces originating from the rotary member 1 or the rotary member mounting arrangement 6. The inclined positioning of the measurement transducer 7 relative to the transmission arrangement 8 is also determined by the above-indicated inclined angle a. That configuration ensures that the measurement transducer 7 is not subjected to loadings and forces which are transmitted to the rotary member mounting arrangement 6 and accordingly to the transmission arrangement 8 when the rotary member 1 is being fitted into the mounting arrangement 6. Therefore, in the operation of putting the rotary member 1 into its position in the apparatus for the measuring run to be performed, the measurement transducer 7 remains relieved of load, thereby avoiding the possibility of consequential damage to the measurement transducer 7.

The illustrated embodiment also shows that the drive motor 12 can be mounted on the machine frame structure 13 on an inclined mounting bracket or support 10, at an inclined angle equal to the above-mentioned angle a.

It will be appreciated that the above-described apparatus has been set forth solely by way of example and illustration of the principles of the present invention and that various modifications and alterations may be made therein without thereby departing from the spirit and scope of the invention.

We claim:

1. An apparatus for measuring an unbalance of a rotary member, comprising:
    a rotary member mounting means for rotatably mounting the rotary member during a measurement operation, the mounting means being adapted to perform oscillating movements in a measurement direction;
    a transducer means for outputting a signal indicative of oscillating forces in said measurement direction produced by said rotary member upon rotation of the rotary member during said measurement operation; and
    a belt drive means for driving the rotary member in rotation during the measurement operation, the belt drive means having a portion which moves substantially in a drive direction, the drive direction being substantially normal to said measurement direction, the rotary member bearing against the drive portion in a generally tangential relationship with the rotary member during the measurement operation,
    wherein said measurement direction is inclined relative to the horizontal direction at an acute angle and wherein said drive direction is offset from the vertical direction so that said rotary member can be moved into and out of said mounting means in substantially the vertical direction unimpeded by the belt drive means.

2. An apparatus as set forth in claim 1 wherein said acute angle is substantially 30°.

3. An apparatus as set forth in claim 1 wherein said rotary member mounting means comprises an upwardly open bearing.

4. An apparatus as set forth in claim 3 wherein said upwardly open bearing is horizontally mounted to be upwardly open in said vertical direction.

5. An apparatus as set forth in claim 1 wherein said transducer means includes a measurement transducer so arranged that it is relieved of load when said rotary member is fitted into said rotary member mounting means.

6. An apparatus as set forth in claim 1 wherein said generally tangential relationship includes driving contact between said rotary member and said belt drive means over a portion of the periphery of said rotary member.

7. An apparatus for measuring an unbalance of a rotary member, comprising: a support structure; a mounting means for rotatably mounting a said rotary member for a measurement operation; supporting means supporting said rotary member mounting means on said support structure in such a way as to permit said mounting means to perform an oscillatory movement in a measurement direction; a measurement transducer means operatively disposed between said support structure and said rotary member mounting means and adapted to detect an oscillating movement of said rotary member mounting means, caused by unbalance of a said rotary member mounted in said mounting means in an unbalance measurement operation, and to supply a signal corresponding to said unbalance of said rotary member; and a belt drive means operable to drive said rotary member in rotation on its said mounting means, the belt drive means including a drive belt having a drive run adapted to bear drivingly against a peripheral surface of said rotary member to drive the rotary member in rotation, the drive direction of said belt drive run in relation to said rotary member being disposed at least approximately normal to said measurement direction of said measurement transducer means, said drive direction of said belt drive run and said measurement direction being divergent from the vertical direction at respective sides of said rotary member mounting means in such a configuration as to permit said rotary member to be moved into and out of said rotary member mounting means without impediment by said belt drive means.

8. An apparatus for measuring an unbalance of a rotary member comprising:
    a rotary member mounting means for rotatably mounting the rotary member during a measurement operation, the mounting means being adapted to perform oscillating movements in a measurement direction;

a transducer means for outputting a signal indicative of movements of said mounting means in said measurement direction caused by rotation of the rotary member during said measurement operation; and a belt drive means for driving the rotary member in rotation during the measurement operation, the belt drive means having a portion which moves substantially in a drive direction, the drive direction being substantially normal to said measurement direction, the rotary member bearing against the drive portion in a generally tangential relationship with the rotary member during the measurement operation, wherein said measurement direction is inclined relative to the horizontal direction at an acute angle and wherein said drive direction is offset from the vertical direction so that said rotary member can be moved into and out of said mounting means in substantially the vertical direction unimpeded by the belt drive means.

9. An apparatus as set forth in claim 8, wherein said acute angle is substantially 30°.

10. An apparatus as set forth in claim 8 wherein said rotary member mounting means comprises an upwardly open bearing.

11. An apparatus as set forth in claim 10 wherein said upwardly open bearing is horizontally mounted to be upwardly open in said vertical direction.

12. An apparatus as set forth in claim 8 wherein said transducer means includes a measurement transducer so arranged that it is relieved of load when said rotary member is fitted into said rotary member mounting means.

13. An apparatus as set forth in claim 8 wherein said generally tangential relationship includes driving contact between said rotary member and said belt drive means over a portion of the periphery of said rotary member.

* * * * *